United States Patent [19]

Heinrich et al.

[11] 4,378,656

[45] Apr. 5, 1983

[54] ANTI-CLAMPING DEVICE FOR A VEHICLE DOOR

[75] Inventors: Siegfried Heinrich, Edermunde; Manfred Horn, Kaufungen, both of Fed. Rep. of Germany

[73] Assignee: Firma Gebr. Bode & Co. GmbH, Kassel, Fed. Rep. of Germany

[21] Appl. No.: 191,770

[22] Filed: Sep. 29, 1980

[30] Foreign Application Priority Data

May 21, 1980 [DE] Fed. Rep. of Germany ....... 3019373

[51] Int. Cl.³ .............................................. E05F 15/20
[52] U.S. Cl. .......................................... 49/28; 49/338; 200/61.62
[58] Field of Search ........................ 49/28, 26, 30, 338, 49/334; 200/61.62, 47, 153 T, 61.21

[56] References Cited

U.S. PATENT DOCUMENTS

| | | | |
|---|---|---|---|
| 1,877,161 | 9/1932 | Conklin | 49/28 X |
| 2,564,067 | 8/1951 | Karp | 49/334 X |
| 2,606,022 | 8/1952 | Vander Veer et al. | 49/334 X |
| 2,790,863 | 4/1957 | Towle | 200/153 T X |
| 2,870,281 | 1/1959 | Mitchell | 200/61.62 X |
| 3,922,814 | 12/1975 | Runft | 49/28 |
| 4,131,830 | 12/1978 | Lee et al. | 49/28 X |

*Primary Examiner*—Philip C. Kannan
*Attorney, Agent, or Firm*—Hane, Roberts, Spiecens & Cohen

[57] ABSTRACT

An anti-clamping device for a vehicle door driven in opening and closing movements by a turnable shaft in turn driven by a transmission rod. The anti-clamping device comprises a telescopic element interposed in the transmission rod and including first and second telescopically engaged parts having retracted and extended positions. A control member is mounted on one of the parts and can be in the form of a projecting pin while spaced switches are mounted on the other of the parts. The pin projects between the switches to operate a selected one thereof depending on whether the parts are telescopically retracted or extended to reverse the direction of door movement. Thereby when an obstacle is present in the path of travel of the door, stress in the transmission rod will be accompanied by telescopic retraction or extension of the parts depending upon whether the door is in its opening or closing movement which produces closure of one of the switches to reverse the direction of door movement.

10 Claims, 5 Drawing Figures

ANTI-CLAMPING DEVICE FOR A VEHICLE DOOR

FIELD OF THE INVENTION

The invention relates to an anti-clamping device for a vehicle door which is driven by a turnable shaft in turn operated by a transmission rod.

PRIOR ART

An anti-clamping device for a vehicle door has the purpose of reversing the movement of the door if during operation of the door an obstacle is encountered, for example, if a person enters the vehicle while the door is in the course of closing.

Anti-clamping devices are known which are operated by pneumatic means. Thus, if an obstacle exerts pressure upon the pneumatic system, a reversal is effected the result of which is that the door performs an appropriately reversed movement. However, such anti-clamping devices operating on a pneumatic basis are, to a certain extent, weather-dependent, because if the temperature rises or falls the pressure in the pneumatic system also changes and thus the response time of the anti-clamping device changes. For this reason, such anti-clamping devices are not always operationally reliable in every instance.

SUMMARY OF THE INVENTION

An object of the invention is to provide an anti-clamping device for a vehicle door, which is temperature independent and which can be retrofitted outside a finger protecting strip on the door.

According to the invention, this is achieved in that an element composed of two telescopically engaged parts is interposed in the transmission rod, one part carrying a control means which acts upon switches which are connected to the other part and connecting means connecting the telescopically engaged parts with the transmission rod.

According to one embodiment of the invention, the telescopically engaged parts comprise two telescopically engaged tubes which are connected by a spring, one tube carrying the control means and the other tube carrying switches at opposite sides of the control means. Each tube is provided with a central mounting projection, for example a projecting pin on which one end of the spring is secured.

Thus, if during closure movement of the door, an obstacle is encountered, then the transmission rod which is driven by the drive attempts to transmit forces in the same direction. Since this is not possible because of the obstacle, the tubes are telescoped together; in so doing, the control means connected to the one tube is displaced and acts upon the switch on the other tube. This causes production of a signal which produces reversal of movement of the door.

A corresponding result is obtained if an obstacle is encountered during the opening movement of the door. In this case, the telescopic parts are moved apart, as a result of which the control means comes into contact with the other switch which produces a signal to cause reversal of movement of the door.

Another embodiment is contemplated in which the one part of the telescopically engaged parts is a tube into which a rod extends which carries the control means, a first elastic means being mounted between an abutment on the tube and the rod, the tube being provided externally with a second elastic means which is supported by the control means and the tube, respectively, with the tube carrying switches at opposite sides of the control means.

Slots for the passage of the control means in the form of a pin are provided in the tube.

Here, also, the encountering of an obstacle during the closure movement of the door results in telescoping together of the telescopically engaged elements, whereby the rod slides in the tube against the first elastic means. Since the rod carries the control means, the latter acts upon one of the switches on the rod and causes appropriate direction reversal of the door.

When the door is opened with a person standing in the path of movement of the door, a direction reversing movement is produced because as a result of the tensile force which occurs during the opening movement of the door and is transmitted to the transmission rod, the telescopically engaged parts are extended to produce the control impulse to reverse the direction of door movement.

The anti-clamping device thus acts during the closure movement as well as during the opening movement of the door.

BRIEF DESCRIPTION OF THE DRAWING

Several exemplary embodiments of the invention are illustrated in the drawing.

DETAILED DESCRIPTION

Figure 1:
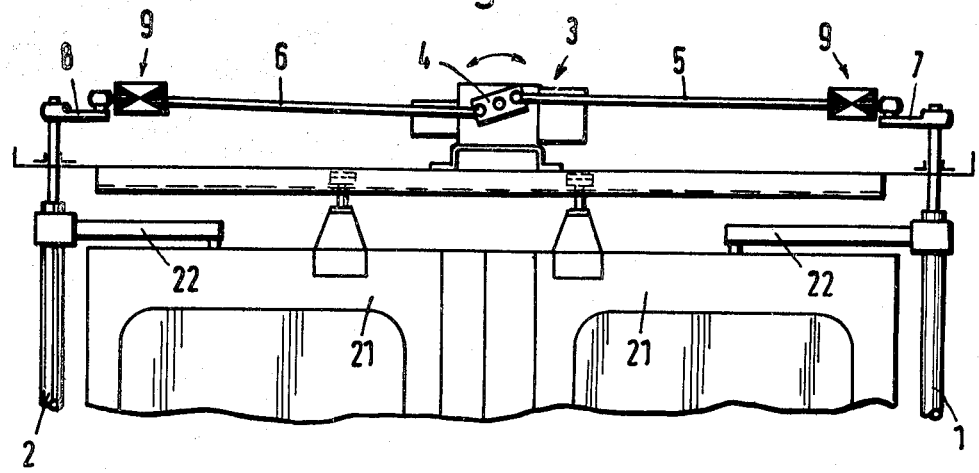
FIG. 1 is an elevation view which shows the drive for the turning shaft in the form of a driven lever and the anti-clamping device arranged in the transmission rod.

As shown in FIG. 1 turnable shafts 1 and 2 are driven by a drive 3 which comprises a centrally driven lever 4 to which transmission rods 5 and 6 are pivotably connected and act upon arms 7 and 8 mounted on the turning shafts 1 and 2 respectively. An anti-clamping device 9 is installed in the transmission rods 5 and 6, respectively.

Figure 2:
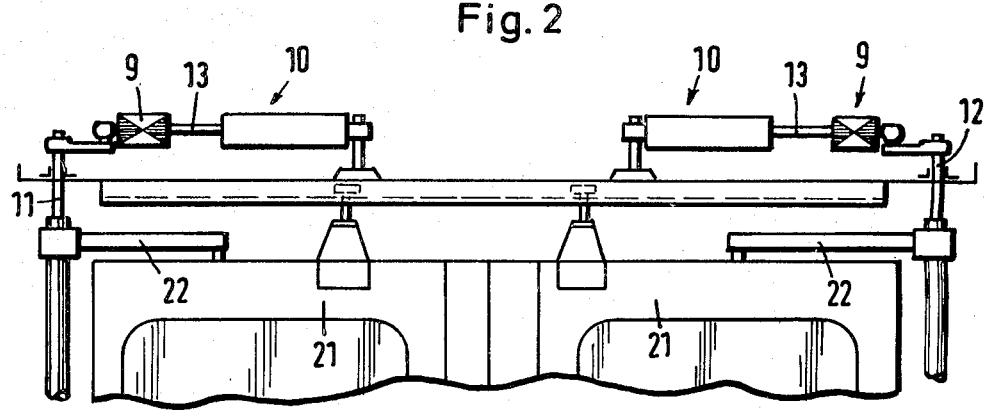
FIG. 2 is a modification which shows a respective piston and cylinder unit for each turnable shaft with the anti-clamping device being installed in each piston rod.

FIG. 2 shows a different embodiment for the drive of the turnable shafts. Therein, piston and cylinder drive units 10 are provided which act upon the turnable shafts 11 and 12, respectively. The anti-clamping device 9 is inserted in the piston rod 13 of each of the drive units 10 which in this case constitutes the transmission rod.

Figure 3:
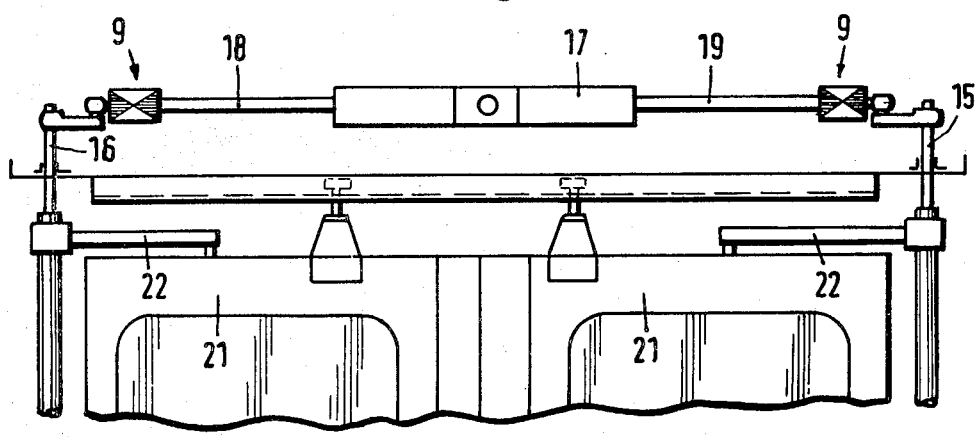
FIG. 3 is a modification which shows a common drive for the two turnable shafts with the anti-clamping device installed in the transmission rods of said drive.

FIG. 3 shows a further embodiment of the drive. Therein, a common drive is provided for the turnable shafts 15 and 16, respectively. The common drive comprises a piston and cylinder unit 17 interposed between piston rods 18 and 19 connected to the anti-clamping device 9.

On turning of the turnable shafts 1, 2, or 11, 12 or 15, 16 a pivotal opening or closure movement of the door elements 21 is effected in known manner by means of the pivot arms 22.

Figure 4:
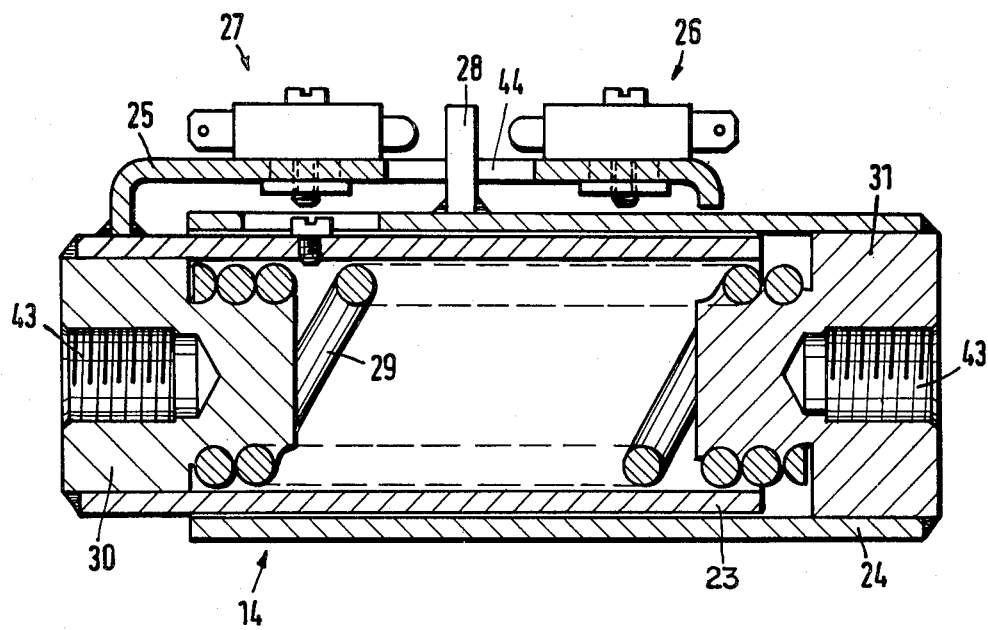
FIG. 4 is a sectional view of the anti-clamping device on an enlarged scale.

FIG. 4 shows in detail one embodiment of the anti-clamping device. This device comprises a telescopic element 14 which includes two parts, namely first tube 23 and second tube 24. The tubes 23 and 24 are provided with tapped bores 43 for threadably receiving respective ends of the transmission rods. Tube 23 carries a bracket 25 supporting two switches 26 and 27. The tube 24 carries a control means in the form of a pin 28 which is located between the switches 26 and 27. The two tubes 23 and 24 are connected by a spring 29 which is secured to a projection 30 on the tube 23 and a projection 31 on the tube 24.

If an obstacle is encountered in the path of pivotal travel of a door member, for example during closure movement of the door member, the tubes 23 and 24 are telescopically retracted whereby the pin 28 acts upon the switch 27, which closes a circuit to produce a signal causing reverse movement of the door member.

If an obstacle is encountered during opening of the door member, the tubes 23 and 24 are telescopically extended so that the control means constituted by the pin 28 acts upon the switch 26 to produce a signal causing reverse movement of the door member.

Free movement of the pin 28 is effected by the provision of a slot 44 in the bracket 25.

Figure 5:
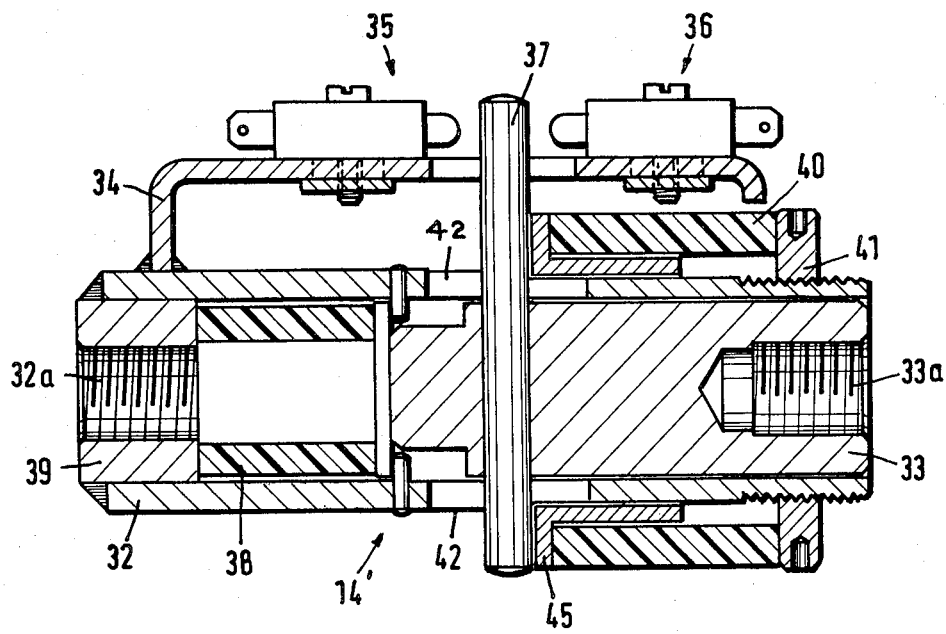
FIG. 5 shows another embodiment of the anti-clamping device.

FIG. 5 shows another embodiment of the telescopic element. In this embodiment, the telescopic element 14' comprises a tube 32 and a rod 33 extending into the tube. The tube 32 is connected at tapped bore 32a to the transmission rod. The rod 33 is connected to the transmission rod 5,6 or 13 or 18,19 at tapped bore 33a. A bracket 34 is affixed to the tube 32 and carries two switches 35 and 36. The rod 33 carries a control means in form of a pin 37 which is located between the switches 35 and 36. An elastic means 38 is mounted in the tube 32 and is located between an abutment 39 secured in the tube 32 and the end of rod 33. Another elastic means 40 is mounted outside the tube 32 and is supported at one end by projection 37 through the intermediary of a slidable guide sleeve 45 on tube 32 which abuts against pin 37 and at the other end by a support 41 which is adjustably secured to the tube 32.

If the telescopic element is retracted by shifting the rod 33 against the elastic means 38 within the tube 32, then the pin 37 also moves and operates the switch 35. The retraction of the telescopic element is produced if, during the closing movement of the door member, an obstacle is encountered in the path of movement of the door member.

If an obstacle is encountered during the opening movement of the door member, then the telescopic element is extended. In so doing, the control means in the form of the pin 37 is pressed against the elastic means 40 and at the same time it is also pressed against the switch 36 with the result that an appropriate direction reversal signal is produced to reverse the direction of travel of the door member.

Slots 42 are provided in the tube 32 for the passage and the free movement of the pin 37.

Although the invention has been described in relation to the preferred embodiments thereof, it will become apparent to those skilled in the art that numerous modifications and variations can be made within the scope and spirit of the invention as defined in the attached claims.

What is claimed is:

1. An anti-clamping device for a vehicle door driven in opening and closing movements by a turnable shaft in turn driven by a transmission rod, said device comprising a telescopic element interposed in said transmission rod, said telescopic element including first and second telescopically engaged parts including means respectively connecting said parts to said transmission rod in axial alignment therewith such that drive to the door is effected through said transmission rod and said telescopic parts, said telescopic parts each being movable to undergo telescopic movement relative to the other part, said telescopic parts having retracted and extended positions, control means on one of said parts and movable therewith and switch means on the other of said parts and movable therewith, said switch means facing and being operatively associated with said control means to control a circuit to reverse the direction of door movement both when the door is opening or closing and encounters an obstacle, said telescopically engaged parts of said telescopic element not undergoing extension or retraction during opening or closing of the door without encountering an obstacle to transmit drive from the transmission rod to the turnable shaft whereas when an obstacle is encountered during opening or closing of the door the telescopically engaged parts undergo relative telescoping movement to produce retraction or extension of said parts to actuate the switch means.

2. A device as claimed in claim 1 wherein said first telescopically engaged part comprises a tube and said second telescopically engaged part comprises a rod, said rod being slidably engaged coaxially in said tube.

3. An anti-clamping device for a vehicle door driven in opening and closing movements by a turnable shaft in turn driven by a transmission rod, said device comprising a telescopic element interposed in said transmission rod, said telescopic element including first and second telescopically engaged parts having retracted and extended positions and respectively connected to said transmission rod, control means on one of said parts and movable therewith and switch means on the other of said parts operatively associated with said control means for being operated thereby to control a circuit to reverse the direction of door movement both when the door is opening or closing and encounters an obstacle, said telescopically engaged parts including respective tubes, said telescopic element further comprising resilient means within said tubes and engaging the tubes for elastically resisting relative telescopic movement therebetween.

4. A device as claimed in claim 3 wherein said tubes each comprise an axial projection, said resilient means having opposite ends engaging the projections on the tubes.

5. A device as claimed in claim 3 wherein said switch means comprises a pair of spaced switches, said control means comprising a projection disposed between said switches.

6. An anti-clamping device for a vehicle door driven in opening and closing movements by a turnable shaft in turn driven by a transmission rod, said device comprising a telescopic element interposed in said transmission rod, said telescopic element including first and second telescopically engaged parts having retracted and extended positions and respectively connected to said transmission rod, control means on one of said parts and movable therewith and switch means on the other of said parts operatively associated with said control means for being operated thereby to control a circuit to reverse the direction of door movement, said first telescopically engaged part comprising a tube and said second telescopically engaged part comprises a rod slidably engaged coaxially in said tube, said telescopic element further comprising a first elastic means in said tube and engaging said tube and said rod to oppose retracted movement thereof and a second elastic means mounted externally of said tube and engaging said tube and said rod to oppose extended movement thereof.

7. A device as claimed in claim 6 wherein said control means is on said rod and said switch means is on said tube.

8. A device as claimed in claim 6 wherein said control means comprises a projecting pin, said tube being provided with slots through which said projecting pin extends for free travel.

9. A device as claimed in 6 wherein said control means is secured to said rod and said second elastic means engages said rod through the intermediary of said control means.

10. A device as claimed in claim 8 comprising axial adjustment means for the engagement of said second elastic means and said tube.

* * * * *